United States Patent [19]
Cheslock

[11] Patent Number: 5,503,571
[45] Date of Patent: * Apr. 2, 1996

[54] MULTI-PURPOSE RECEPTACLE

[75] Inventor: Edward P. Cheslock, Lincoln University, Pa.

[73] Assignee: Lasko Holdings, Inc., Wilmington, Del.

[ * ] Notice: The portion of the term of this patent subsequent to Sep. 16, 2011, has been disclaimed.

[21] Appl. No.: 257,833

[22] Filed: Jun. 9, 1994

Related U.S. Application Data

[63] Continuation-in-part of Ser. No. 118,307, Sep. 9, 1993, Pat. No. 5,344,339.

[51] Int. Cl.$^6$ .................................................. H01R 13/73
[52] U.S. Cl. ...................... 439/501; 439/577; 206/372; 206/373

[58] Field of Search ....................... 439/501, 577; 206/372, 373, 518, 503; 220/735

[56] References Cited

U.S. PATENT DOCUMENTS

| | | | |
|---|---|---|---|
| 4,875,878 | 10/1989 | Meyer | 439/577 |
| 5,011,013 | 4/1991 | Meisner et al. | 206/373 |
| 5,117,979 | 6/1992 | Brightbill | 206/373 |

Primary Examiner—Gary F. Paumen
Attorney, Agent, or Firm—Zachary T. Wobensmith, III

[57] ABSTRACT

A multipurpose receptacle that functions as a portable caddy, an internal and external storage container, a support platform, a step stool and which has a detachable extension cord assembly with electrical outlets. The receptacle is formed of molded plastic with internal nesting trays, and with external tool carrying slots and pockets, a work platform, and connection to a source of electrical power.

8 Claims, 6 Drawing Sheets

MULTI-PURPOSE RECEPTACLE

CROSS REFERENCE TO RELATED APPLICATIONS

This application is a continuation in part of the prior application of Edward P. Cheslock, Ser. No. 08/118,307 filed Sep. 9, 1993 entitled "MULTI-PURPOSE RECEPTACLE", now U.S. Pat. No. 5,344,339.

BACKGROUND OF THE INVENTION

1. Field of the Invention

This invention relates to a multi-purpose portable receptacle of the type that is useful to support a person, provide a source of electric power, and to transport and store tools and other items.

2. Description of the Prior Art

There is an ever increasing trend among home owners and others to do major and minor repairs, modifications and improvements to their own properties.

Various apparatus have been proposed to assist the handyman such as shown in the U.S. Patents to Armbruster No. Des. 269,116; Armbruster No. Des 275,698; Jeannotte No. 1,635,183; Zerver No. 2,819,938; Croteau No. 3,099,398; Van Leewen No. 3,751,845; Culbertson No. 4,101,089; Carlow No. 4,353,613; Kaiser No. 4,366,998; Armbruster No. 4,424,006; Armbruster No. 4,483,664; Meyer No. 4,875,878; Modica No. 5,076,405; and Foster No. 5,083,241.

One of the problems encountered in undertaking projects which the prior art does not solve is the easy storage and transport of the multiplicity of tools required to perform the tasks. Tool boxes have long been available to carry individual tools such as power drills, sanders, hammers, screwdrivers and other tools but most of them are single purpose, and not suitable for carrying a variety of tools. In addition, electricity to operate power tools and illuminate the job site is often not readily available on or close to the job site, necessitating separate extension cords and portable lights. Support for the person doing the work is often necessary whether it be a convenient seat or a step stool to permit reaching the ceiling or the top of a doorway. If lumber such as studs or molding are to be cut, saw horses or other support is often required.

The prior Cheslock receptacle provides many improvements over the prior art, but does not provide sufficient useful internal and external tool storage, and a detachable extension cord assembly.

It is also often desirable to be able to load up a tray or trays with tools and hardware for specific jobs, and to carry one or more trays inside the receptacle that have been pre-loaded with particular items specific to a job, such as plumbing, hardware or electrical items.

The invention fulfills the demands of the handyman and mechanic by providing a portable, multipurpose receptacle that also serves as a tool caddy, with multiple internally carried nesting trays, external tool storage, a work platform, step stool, and a detachable electric extension cord assembly for connection to a source of electric power.

SUMMARY OF THE INVENTION

This invention relates to a multipurpose receptacle which is useful as a portable tool caddy, with both internal and external tool storage, work platform, step stool and connection to a source of electricity.

The principal object of the invention is to provide a portable multipurpose receptacle.

A further object of the invention is to provide a receptacle of the character aforesaid which provides easy connection to a source of electric power.

A further object of the invention is to provide a receptacle of the character aforesaid which has both internal and external provisions for carrying tools and other objects.

A further object of the invention is to provide a receptacle of the character aforesaid which provides both a step stool and a work platform.

A further object of the invention is to provide a receptacle of the character aforesaid which has a plurality of nesting trays therein which can be separated and carried outside the receptacle.

A further object of the invention is to provide a receptacle of the character aforesaid which includes a detachable electric cord extension assembly.

A further object of the invention is to provide a receptacle of the character aforesaid which is simple and inexpensive to construct but sturdy and reliable in use.

A further object of the invention is to provide a receptacle of the character aforesaid which is preferably formed of a lightweight molded plastic.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figure 1:
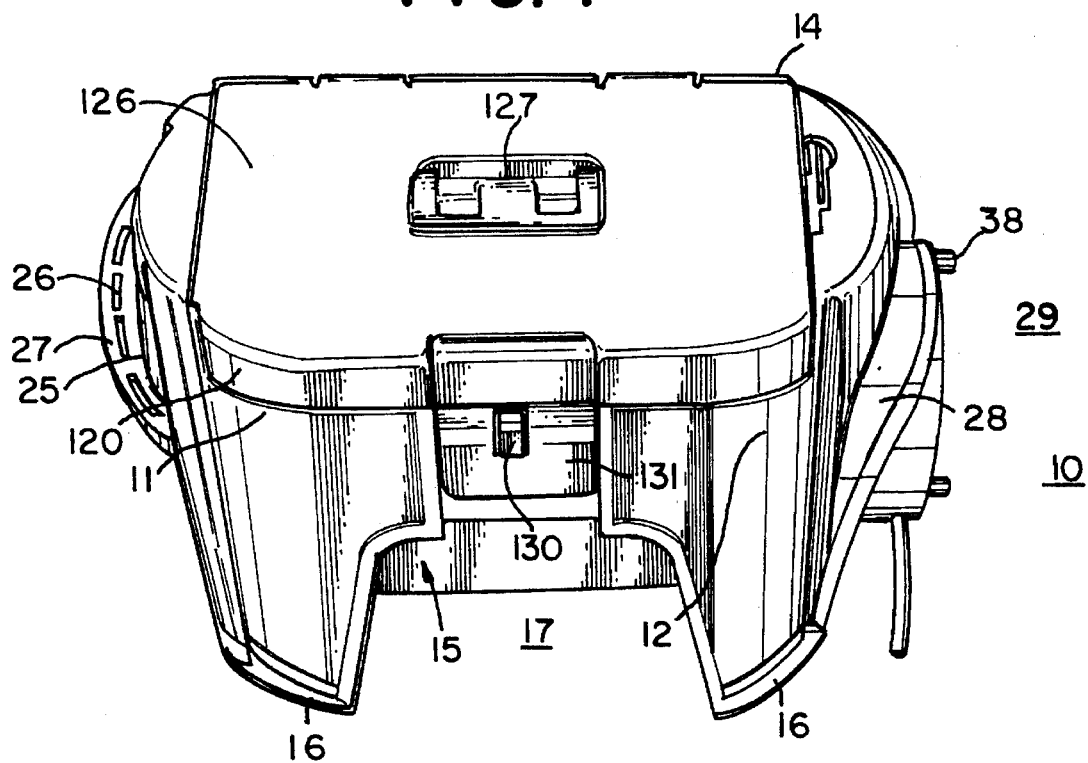
FIG. 1 is a front elevational view of the receptacle of the invention.

It should of course be understood that the description and drawings herein are merely illustrative and that various modifications and changes can be made in the structure disclosed without departing from the spirit of the invention.

Like numbers refer to like parts throughout the several views.

DESCRIPTION OF THE PREFERRED EMBODIMENT

Referring now more particularly to the drawings and FIGS. 1 to 10 thereof the multipurpose receptacle 10 is therein illustrated. The receptacle 10 includes a housing 11 open at the top, with a curved semi-circular front wall 12, which extends around to and meets a substantially flat rear wall 14.

The front wall 12 is provided with a cutout 15 and two feet 16 which rest on the floor or other surface 17 for support. The rear wall 14 is also provided with a cutout 18 and has two feet 19 which rest on the floor or other surface 17 for support.

The rear wall 14 is provided with a pair of tool holsters 20 which are integral with the wall, are approximately one half the height of the rear wall 14, extend outwardly therefrom of semi-circular shape, and which can accumulate a variety of power tools (not shown) such as a drill, screwgun, or other tools that fit into the holsters. The rear wall 14 between and spanning the holsters 20 is provided with a pocket 21, which can accommodate the cords from power tools (not shown) carried in the holsters 20.

The front wall 12 at the left as seen in FIGS. 1, 3, 4 and 6 has a semi-circular tool holder 25 mounted thereon, which can accommodate a plurality of tools such as screwdrivers and chisels (not shown) which are retained in slots 26, 27 therein.

Referring now to FIGS. 1, 2, 4, 5, 8, 9 and 10 the wall 12 has a circular projecting rim 28 extending from the right side. The rim 28 extends over an electrical power cord assembly 29, which has an outer housing 30 of generally circular configuration, with a retractable power cord 31 extending therefrom through an opening 32, with a plug 33 on the end and which is wound about a spool 34. The spool 34 which is rotatably carried in housing 30 (not shown) has a face plate 35 with a plurality of slots 36 therein, a pair of power outlets 37 of conventional type, and has rewind handles 38 attached to plate 35 to rotate spool 34 and retract cord 31 into housing 30.

The housing 30 has a handle 40 extending therefrom, and a U-shaped channel 41 extending across the back 42 of housing 30. The U-shaped channel 41 engages a rim 43, when the housing 30 is carried in receptacle 10, which is shown in FIG. 5.

Figure 8:
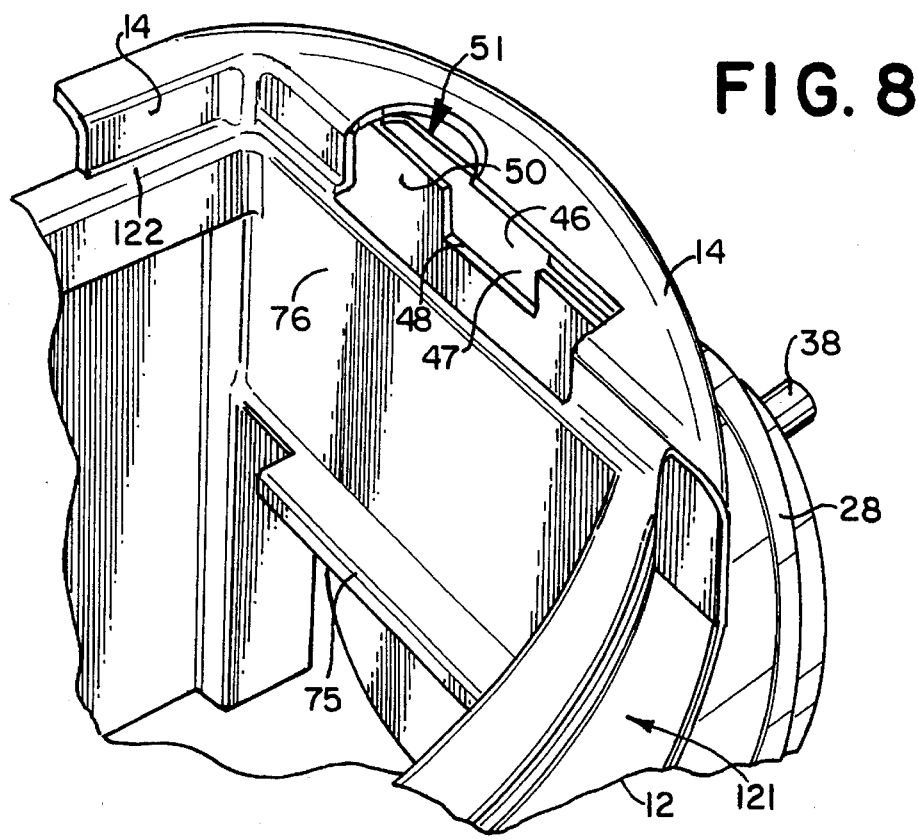
FIG. 8 is a fragmentary, front perspective view, enlarged with the receptacle lid in its open position and illustrating details of the internal structure for retention of the electric power cord assembly.
Figure 9:
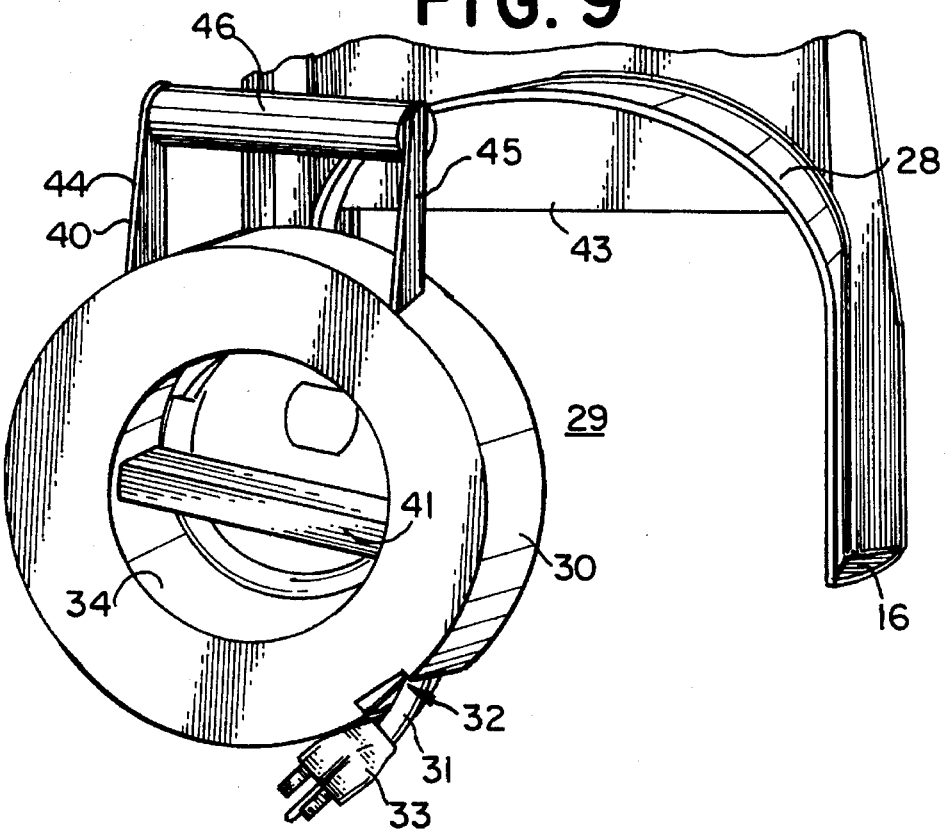
FIG. 9 is a fragmentary, perspective view, enlarged, illustrating the detached electric power cord assembly from the rear thereof.
Figure 10:
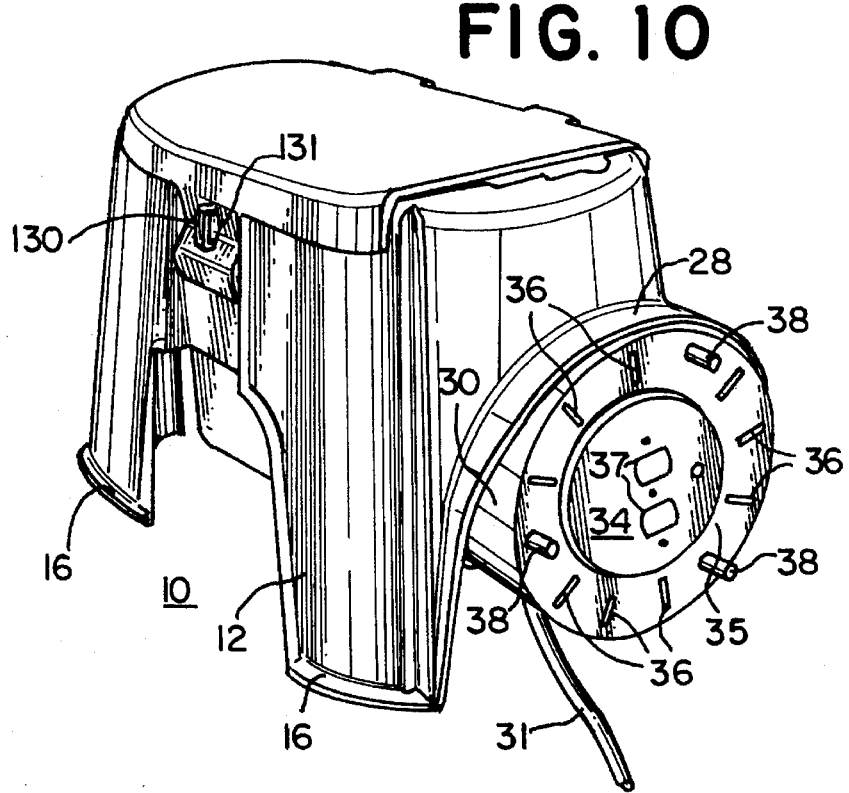
FIG. 10 is an end elevational view of the receptacle of FIG. 1.

The handle 40 includes two legs 44 and 45 which extend from the housing 30 and a plate 46 which connects the legs 44 and 45. The plate 46 has a tongue 47 extending therefrom, which is engaged with rim 48 of plate 50 for retention in receptacle 10 as shown in FIG. 8. Plate 50 is of a spring-like plastic, extends across and is secured at its bottom (not shown) to receptacle walls 12 and 14. The plate 50 is normally biased to the outside of the right side of receptacle 10 and can be accessed through cutout 51 to detach it from tongue 47 to remove assembly 29 from receptacle 10.

Figure 5:
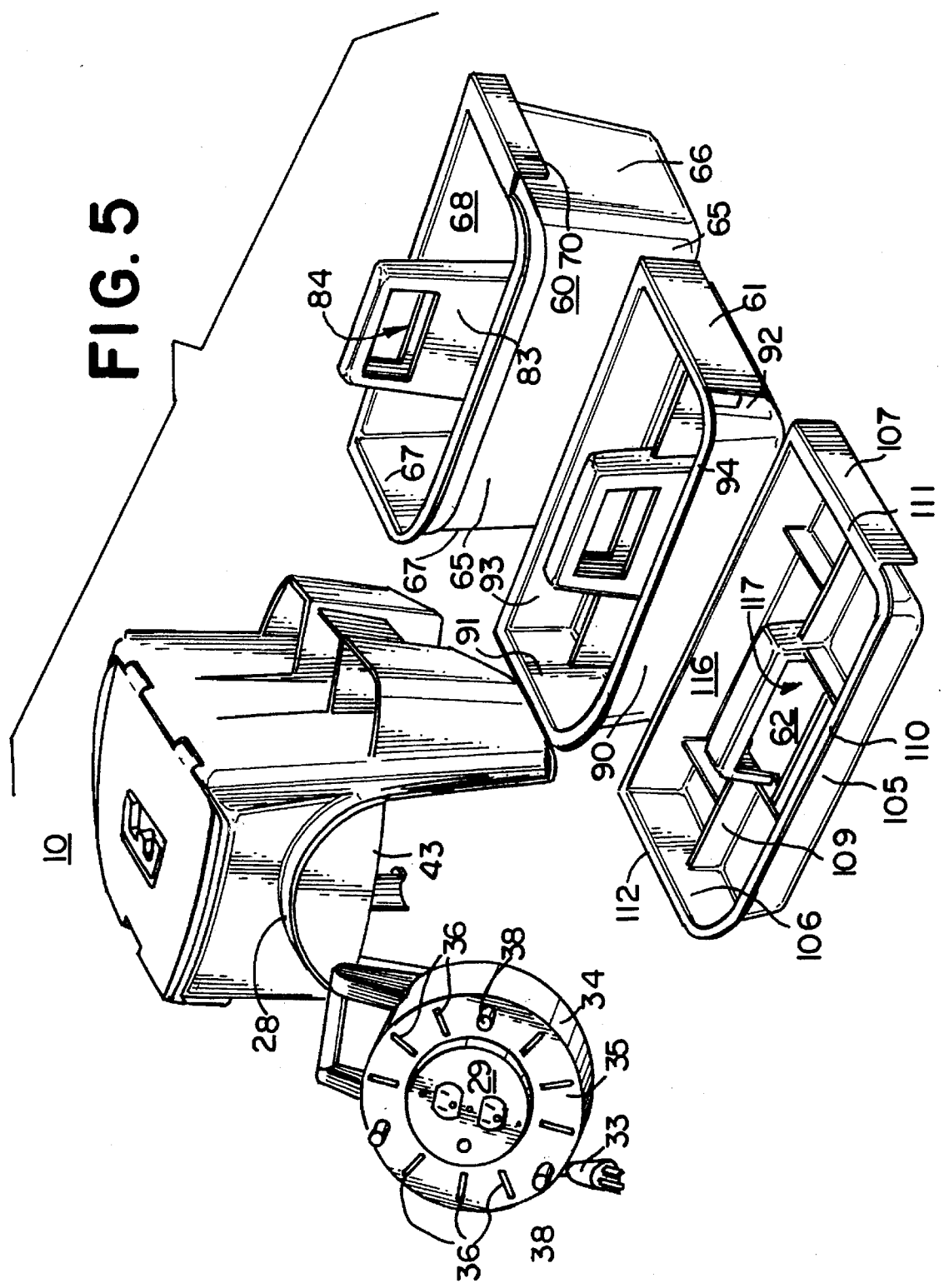
FIG. 5 is a right side view of the receptacle of FIG. 1 with the tool trays and electric power extension cord assembly detached from the receptacle.
Figure 6:
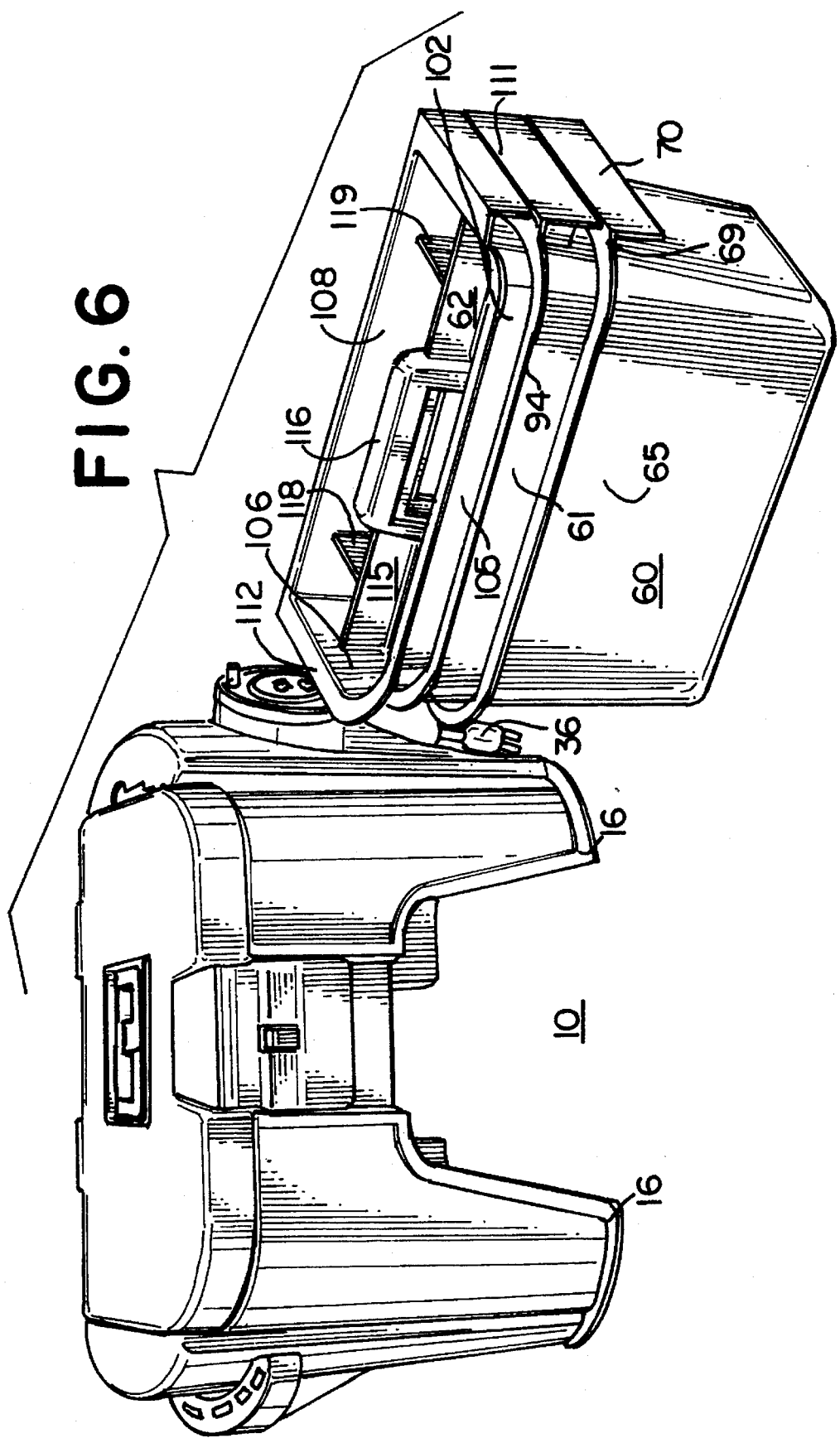
FIG. 6 is a front, elevational view of the receptacle of FIG. 1 with the tool trays removed from the receptacle and stacked.
Figure 7:
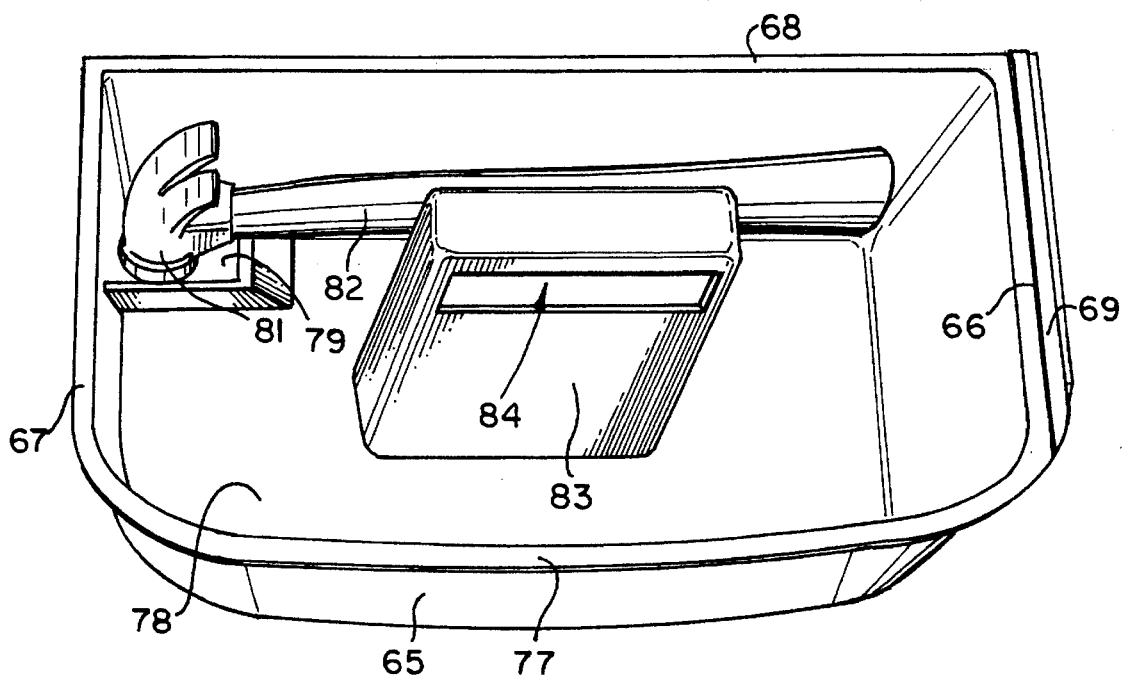
FIG. 7 is a top elevational view of the largest of the nesting trays illustrating the storage of a hammer therein.

Referring additionally to FIGS. 5, 6 and 7 the receptacle 10 is shown with a plurality of nesting trays which can be carried therein. Three trays are illustrated: i.e., a main tray 60, an intermediate tray 61, and a top tray 62. Main tray 60 is the largest and deepest tray, with virtually the same overall outside configuration as receptacle 10. Receptacle 10 is hollow in its center to receive the trays 60, 61 and 62.

The main tray 60 has a curved front wall 65, right side flat wall 66, left side flat wall 67, and flat connecting rear wall 68. The right side wall 66 has a rim 69 at the top, with a vertical wall 70 parallel to wall 66 and engaged with a rim 75 of an internal right side connecting wall 76 of receptacle 10. Walls 65, 67 and 68 have a top rim 77 connecting them extending around the periphery of the tray 60. The tray 60 also has a bottom wall 78, which has a channel 79 extending upwardly therefrom, which has the head 81 of a hammer 82 therein for storage. The bottom wall 78 has a rectangularly shaped hollow post 83 extending upwardly therefrom, with cutouts 84 to provide a hand hold for lifting and carrying tray 60. The main tray 60 also has a left side vertical wall 86 parallel to wall 67 and engaged with a rim (not shown) of an internal left side connecting wall (not shown) similar to wall 76.

The intermediate tray 61 has the same overall outside configuration as tray 60, with a curved front wall 90, side walls 91 and 92, and rear wall 93. The walls 90, 91, 92 and 93 are approximately one third the depth of walls 65, 66, 67 and 68 and fit into main tray 60. The walls 90, 91, 92 and 93 have a flat top rim 94 extending therearound connecting them, which rim 94 has vertically extending walls 95 and 96 parallel to and extending down from rim 94 to contact rim 77 of main tray 60 for support. The tray 61 has a divider wall 98 therein which extends lengthwise from wall 91 to wall 92 and is connected to bottom wall 99. A hollow post 100 extends upwardly from bottom wall 99, which fits over post 83 and has cutouts 101 for carrying and for access to cutouts 84.

The top tray 62 is also of the same overall configuration as trays 60 and 61 but smaller so that it can nest in tray 61, and is approximately one half the depth of tray 61. Top tray 62 has a curved front wall 105, side walls 106 and 107, a rear wall 108 and a bottom wall 109. The walls 105, 106, 107 and 108 have a top rim 110 connecting them, which rim 110 has vertically extending walls 111 and 112 parallel to walls 106 and 107 and which engage rim 94 of tray 61 for support. The bottom wall 109 has a lengthwise divider wall 115 extending upwardly therefrom, with a central raised member 116, which fits over post 100 and with cutouts 117 therein for access for carrying. Additional divider walls 118 and 119 are provided which extend transversely to divider wall 115 to form compartments therewith to carry items (not shown) to be separated such as screws, washers, bolts and other such items (not shown).

The receptacle 10 and the trays 60, 61 and 62 are all preferably made of molded plastic and preferably polyvinylchloride.

Figure 2:
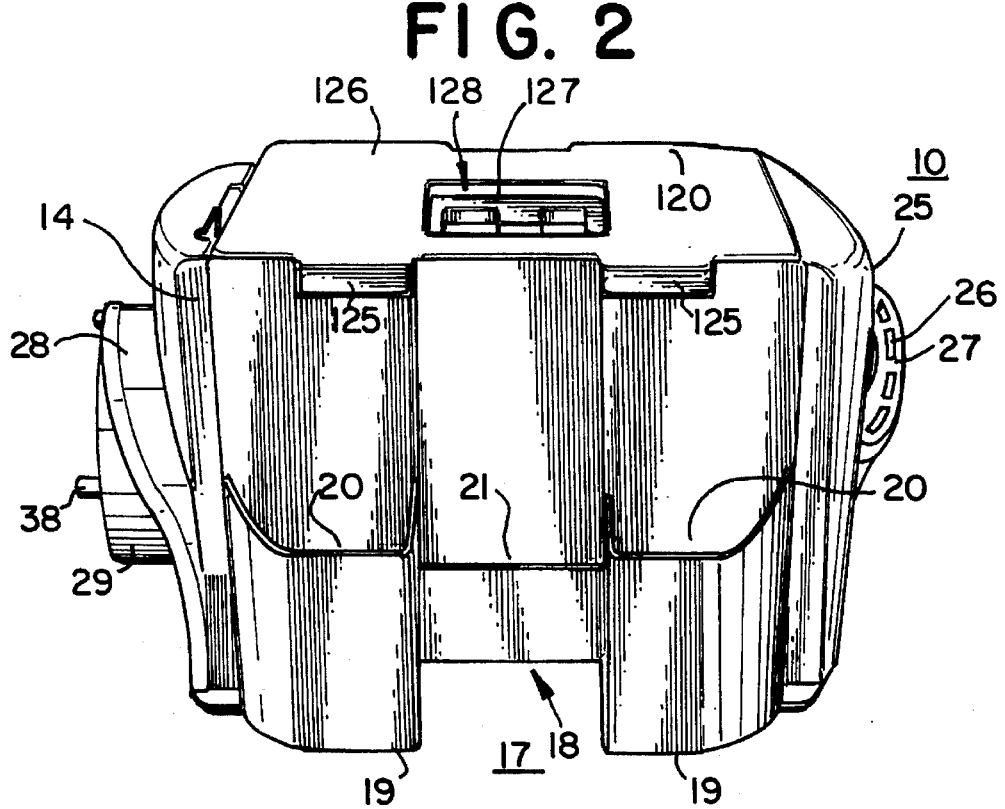
FIG. 2 is a rear elevational view of the receptacle of FIG. 1.
Figure 3:
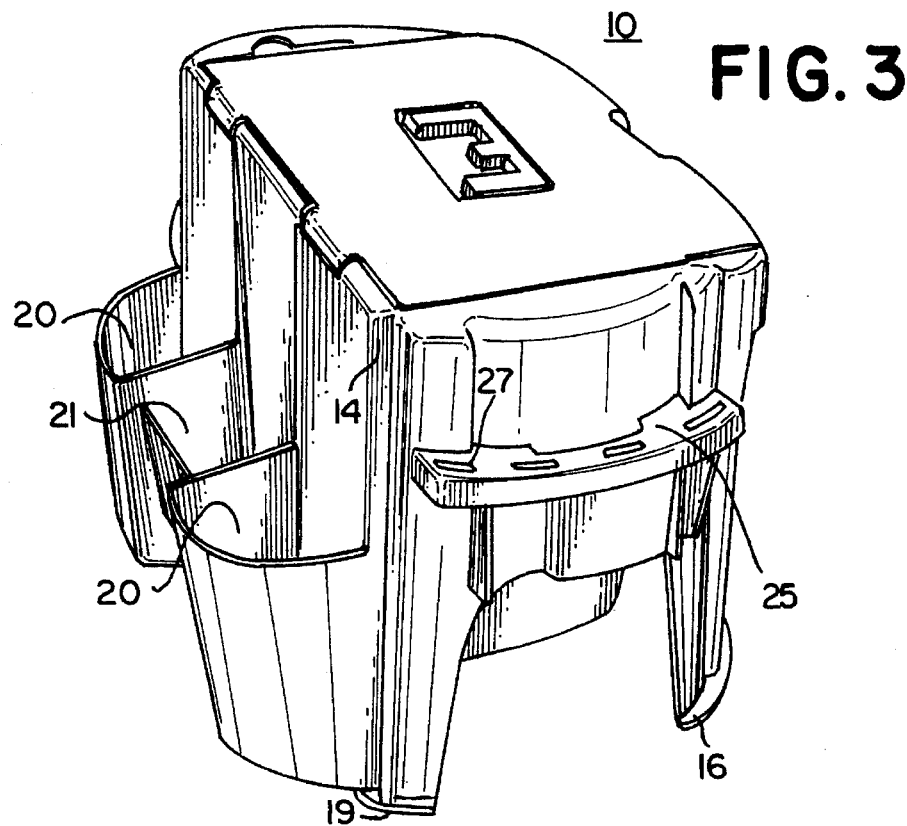
FIG. 3 is a left side view of the receptacle of FIG. 1.
Figure 4:
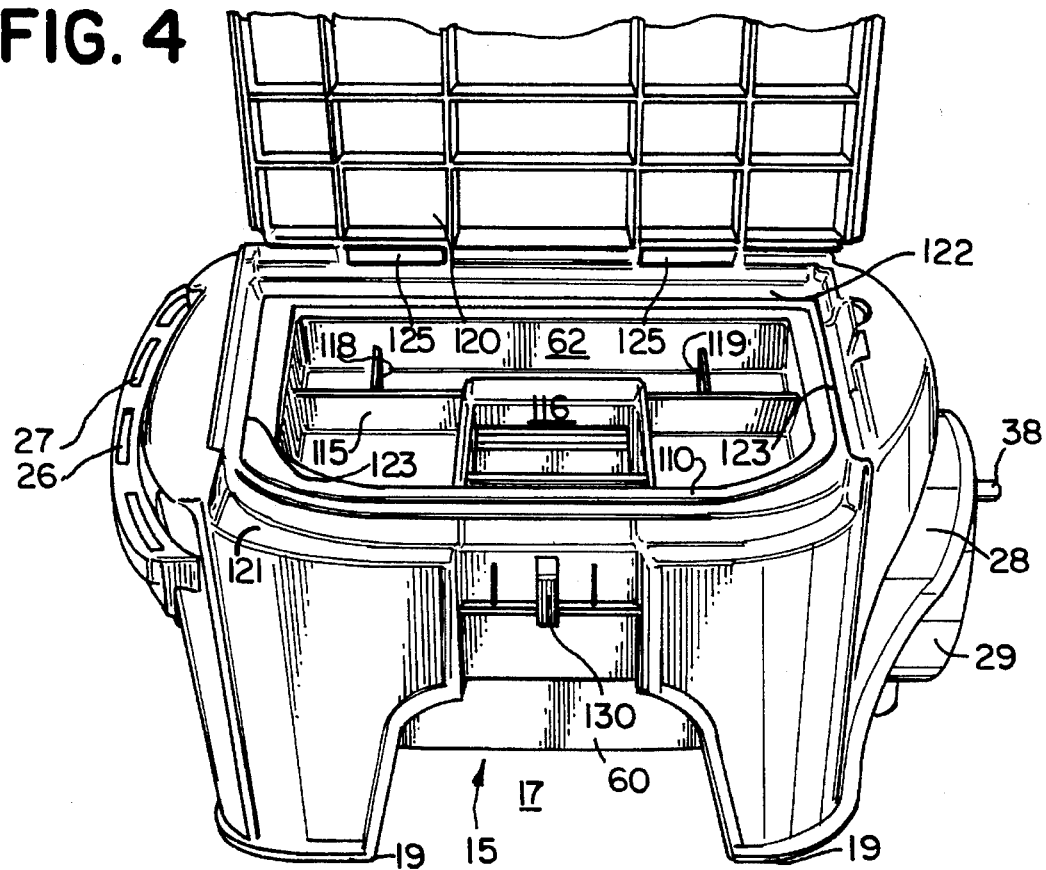
FIG. 4 is a front view of the receptacle of FIG. 1 showing details of the internal construction.

Referring now specifically to FIGS. 1, 2 and 4 the receptacle 10 is provided with a lid 120 which closes off access to the interior of receptacle 10. The front wall 12 has a recessed rim 121, the rear wall 14 has a recessed rim 122 with recessed rims 123 at the right and left sides of the receptacle, which receive the lid 120 in closed position. The lid 120 is also formed of molded synthetic plastic of well known type, such as polyvinylchloride. The lid 120 is connected to back wall 14 by a pair of hinges 125, of conventional type, about which the lid rotates to permit or deny access to the interior of housing 10.

The lid 12 has an external surface 126 which is of a well known tread-like pattern to provide a non-slip surface. The lid 120 is also provided with a carrying handle 127 which is of U-shape and hinged by a pin (not shown) to lid 120, and which may be stored in a recess 128 in lid 120 when desired. The front wall 12 has a lock piece 130 extending therefrom in selective engagement with a hinged catch 131 which extends from lid 120. The catch 131 is recessed to permit a lock (not shown) to engage with holes (not shown) in lock piece 130, should it be desired to secure the receptacle 10.

It will thus be apparent that apparatus has been provided with which the objects of the invention are achieved.

I claim:

1. A multipurpose portable receptacle that combines a tool caddy, work platform, electrical outlet, and step stool which comprises a semi-circular housing open at the top, a lid hingedly connected to and closing off the housing opening providing selective access thereinto, said lid having carrying handle means, lock means to detachably secure said lid to the housing, internally carried detachable nesting tray means, and detachable electrical outlet power means to provide a source of electrical power.

2. A receptacle as defined in claim 1 in which said housing is formed of a curved front wall and a flat back wall, at least one holster connected to and extending from said rear wall to receive power tools, at least one pocket attached to and extending from said rear wall to receive electric cords from said power tools.

3. A receptacle as defined in claim 1 in which said lid is provided with a non-skid surface.

4. A receptacle as defined in claim 1 in which said electrical outlet power means is a housing detachably carried by said receptacle.

5. A receptacle as defined in claim 1 in which a retractable cord is provided for connection with said receptacle electrical outlet power means to a source of electric power.

6. A receptacle as defined in claim 1 in which said nesting tray means is at least two nesting trays, said trays have means for storage of tools and hardware therein, and said trays have handle means for carrying when detached from said receptacle.

7. A receptacle as defined in claim 1 wherein said housing is formed of molded plastic.

8. A receptacle as defined in claim 1 in which said front wall has a lock piece extending therefrom, said lock piece has openings therethrough, a hinged catch on said lid in selective engagement with said lock piece, and lock means for engagement with said catch and said lock piece.

* * * * *